July 8, 1952  J. FINN  2,602,730
APPARATUS FOR TREATING NOXIOUS GASES
Filed March 29, 1950

INVENTOR.
John Finn
BY
Att'y

Patented July 8, 1952

2,602,730

UNITED STATES PATENT OFFICE 2,602,730

APPARATUS FOR TREATING NOXIOUS GASES

John Finn, San Francisco, Calif.

Application March 29, 1950, Serial No. 152,543

1 Claim. (Cl. 23—284)

This invention relates to a smoke and fume purifier.

The principal object of this invention is to produce a purifier for treating the exhaust of diesel engines, and particularly those which are used in confined areas, such as mines, tunnels and the like.

A further object is to provide means for converting the exhaust of a diesel engine from an injurious, noxious gas to an oxidized innoxious gas which will not be harmful to persons in close proximity thereto; as, for instance, tunnel workers or diesel engine operators.

Other objects and advantages will be apparent during the course of the following description.

Figure 1:
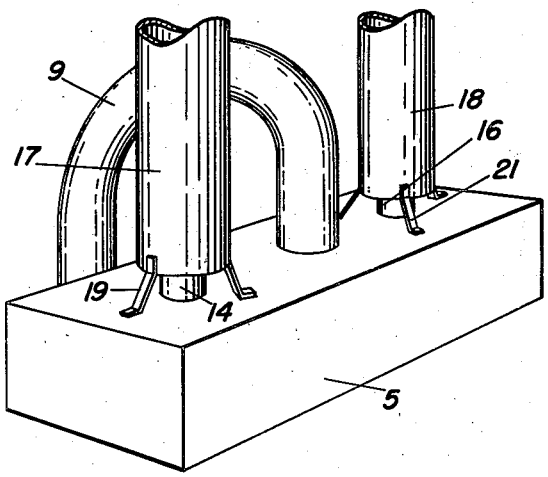
Figure 2:
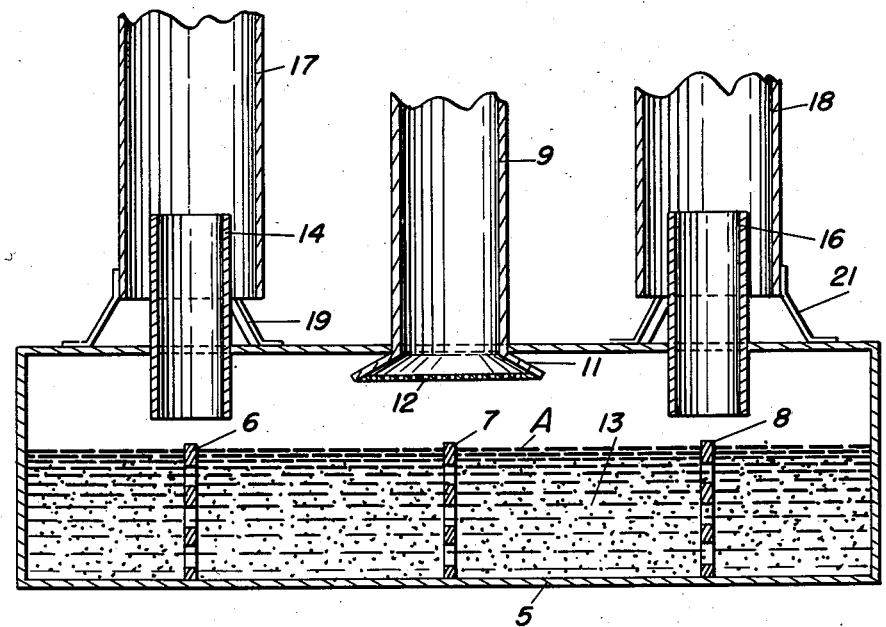

In the accompanying drawings forming a part of this specification and in which like numerals are employed to designate like parts throughout the same, Fig. 1 is a perspective view of my purifier, and Fig. 2 is an enlarged vertical cross-sectional view of my purifier, and on an enlarged scale.

In mines, tunnels and like places, the use of diesel engines has resulted in the workmen adjacent thereto becoming violently ill, suffering extreme nausea, and requiring long periods of rest, with the result that the use of diesel engines has been almost prohibitive in confined areas.

Applicant has, therefore, devised a purifier which will not only remove the carbon monoxide gas, but will also treat the other fumes incident to burning oil and the resultant smoke therefrom.

Referring to the accompanying drawings wherein, for the purpose of illustration, is shown a preferred embodiment of my invention, the numeral 5 designates a receptacle which is mounted on the tractor or adjacent the diesel engine, which receptacle has a series of perforated baffles, as shown at 6, 7 and 8, which extends upwardly into the receptacle.

Extending through the top of the receptacle is a pipe 9, which is connected to the exhaust pipe of the diesel motor, the gases of which are to be purified.

The lower end of the pipe 9, has a flared end 11, and a perforated screen 12, which screen and flared end tend to dissipate the exhaust gases downwardly toward the surface A, of the oxidizing fluid 13.

Also extending through the top of the receptacle are discharge pipes, as shown at 14 and 16. These pipes exhaust into large pipes 17 and 18 respectively, which surround the upper end of these pipes and are supported by braces 19 and 21 respectively.

Within the fluid I preferably use a metallic catalyst, such as iron oxide.

The result of this construction is that, when my device is connected to a diesel engine, the exhaust gases given off thereby will be conducted by the pipe 9, downwardly into the receptacle and through the perforated screen 12, where they will blast onto the surface of the fluid to cause agitation of the fluid to the extent that the interior of the receptacle will be filled with a spray which, in turn, serves to scrub the gases to oxidize them to change the nitric to nitrous, after which these gases pass up through the stacks 14 and 16 and into the pipes 17 and 18. As these gases leave the receptacle under considerable velocity, air will be sucked into the lower end of the pipes 17 and 18, to comingle with the exhausting gases, thus causing further oxidization of the gases and the reduction of fumes to the point where the nitrate is so diluted that it is no longer noxious or toxic to those working adjacent thereto.

Under actual working conditions, the device reduces the carbon monoxide and absorbs the noxious fumes to a point where it is well within the limits of the safety code as called for under State regulations.

The baffles 6, 7 and 8, prevent excessive slopping of the fluid in the receptacle, which fluid is preferably water, and which is replenished from time to time, as the same evaporates.

It will thus be seen that I have produced an apparatus for treating noxious gases which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A device for treating noxious gases, comprising a receptacle adapted to containing an oxidizing fluid, a plurality of vertically arranged baffles positioned in said receptacle, the top edge of said baffles being spaced from the top of said receptacle, a gas inlet pipe entering said receptacle at a point above the upper margin of said baffles, a pair of spaced discharge pipes positioned remotely from said inlet pipe, and stacks mounted on said receptacle, each of said stacks surrounding one of said discharge pipes and concentrically spaced therefrom and from said receptacle, whereby an aspirator action will take place when gases are discharged through said discharge pipes.

JOHN FINN.

REFERENCES CITED

The following references are of record in the file of this patent:

UNITED STATES PATENTS

| Number | Name | Date |
|---|---|---|
| 283,025 | Rowan | Aug. 14, 1883 |
| 1,032,536 | Gerli et al. | July 16, 1912 |
| 2,409,558 | Gunn | Oct. 15, 1946 |